(12) United States Patent
Numata

(10) Patent No.: US 10,593,496 B2
(45) Date of Patent: Mar. 17, 2020

(54) HIGH-SPEED CLOSING DEVICE AND SWITCHGEAR INCLUDING HIGH-SPEED CLOSING DEVICE

(71) Applicant: MITSUBISHI ELECTRIC CORPORATION, Chiyoda-ku, Tokyo (JP)

(72) Inventor: Shinichi Numata, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 637 days.

(21) Appl. No.: 15/317,304

(22) PCT Filed: May 26, 2015

(86) PCT No.: PCT/JP2015/065077
§ 371 (c)(1),
(2) Date: Dec. 8, 2016

(87) PCT Pub. No.: WO2016/031327
PCT Pub. Date: Mar. 3, 2016

(65) Prior Publication Data
US 2017/0126000 A1 May 4, 2017

(30) Foreign Application Priority Data

Aug. 28, 2014 (JP) .................................. 2014-173953
Sep. 24, 2014 (JP) .................................. 2014-193919

(51) Int. Cl.
*H01H 39/00* (2006.01)
*H02H 9/04* (2006.01)
(Continued)

(52) U.S. Cl.
CPC .............. *H01H 39/004* (2013.01); *H02B 1/16* (2013.01); *H02H 3/16* (2013.01); *H02H 7/20* (2013.01); *H02H 9/041* (2013.01)

(58) Field of Classification Search
CPC ........ H01H 39/004; H02B 1/16; H02B 11/28; H02B 13/075; H02H 7/20; H02H 9/04–045
See application file for complete search history.

(56) References Cited

U.S. PATENT DOCUMENTS 3,932,717 A * 1/1976 Dike .................... H01H 39/004
200/61.08
4,417,519 A * 11/1983 Lutz .................... H01H 39/004
102/263
(Continued)

FOREIGN PATENT DOCUMENTS

| FR | 921463 A | 5/1947 |
| JP | 55-39630 U | 3/1980 |

(Continued)

OTHER PUBLICATIONS

International Search Report (PCT/ISA/210) dated Aug. 25, 2015, by the Japanese Patent Office as the International Searching Authority for International Application No. PCT/JP2015/065077.
(Continued)

*Primary Examiner* — Thienvu V Tran
*Assistant Examiner* — Christopher J Clark
(74) *Attorney, Agent, or Firm* — Buchanan Ingersoll & Rooney PC

(57) ABSTRACT

A high-speed closing device includes a first fixed contactor which is made from a conductive material; a second fixed contactor which is made from a conductive material, and faces the first fixed contactor so as to be arranged; and a movable contactor, of which a tip is made from a conductive material, which includes a hollow hole, in which an opposite
(Continued)

side of the tip is opened, at an inner portion, and is separated from the first fixed contactor and the second fixed contactor with a distance being longer than an insulation distance so as to be arranged before the high-speed closing device is closed, and inserts the tip between the first fixed contactor and the second fixed contactor after the high-speed closing device is closed, and electrically connects the first fixed contactor and the second fixed contactor.

24 Claims, 12 Drawing Sheets

(51) Int. Cl.
*H02B 1/16* (2006.01)
*H02H 3/16* (2006.01)
*H02H 7/20* (2006.01)

(56) References Cited

U.S. PATENT DOCUMENTS

| 2003/0231443 A1* | 12/2003 | Shea | H01H 39/004 |
| | | | 361/42 |
| 2003/0231452 A1* | 12/2003 | Hetzmannseder | H01H 79/00 |
| | | | 361/120 |
| 2009/0120773 A1* | 5/2009 | Gentsch | H01H 39/004 |
| | | | 200/239 |
| 2009/0141416 A1 | 6/2009 | Dommaschk et al. | |
| 2010/0219162 A1 | 9/2010 | Gentsch | |
| 2010/0328014 A1 | 12/2010 | Suzuki et al. | |

FOREIGN PATENT DOCUMENTS

| JP | 3432236 B2 | 8/2003 |
| JP | 2009-527877 A | 7/2009 |
| JP | 2011-025912 A | 2/2011 |
| JP | 5254340 B2 | 8/2013 |
| KR | 10-2010-0051844 A | 5/2010 |
| WO | WO 1996/019816 A1 | 6/1996 |
| WO | WO 2007/137780 A1 | 12/2007 |

OTHER PUBLICATIONS

Written Opinion (PCT/ISA/237) dated Aug. 25, 2015, by the Japanese Patent Office as the International Searching Authority for International Application No. PCT/JP2015/065077.

UFES S3-Speed, Safety, Savings (ABB Medium Voltage Products Catalog), 36 pages.

Office Action (Notification of Reason for Refusal) dated Feb. 19, 2018, by the Korean Patent Office in corresponding Korean Patent Application No. 10-2017-7002985 and English translation of the Office Action. (9 pages).

* cited by examiner

HIGH-SPEED CLOSING DEVICE AND SWITCHGEAR INCLUDING HIGH-SPEED CLOSING DEVICE

BACKGROUND OF THE INVENTION

Technical Field

The present invention relates to a high-speed closing device which quickly grounds an electric circuit, at which a fault is caused, and can flow a fault electric current to the earth, or rapidly short-circuits between electric circuits, at which a fault is caused, and can detour and pass a fault electric current, when an electric fault, such as a ground fault or a short circuit, is caused in switchgear.

Background Art

An electric power receiving and transforming system is a facility system which is essential for a social infrastructure for an electric power supply and demand of a building, a factory or the like, and very high safety and reliability are required. Therefore, a process, in which safety and reliability are sufficiently considered for an overall procedure of a production step, installation work, operation, and maintenance, is used. However, there is very rare case in which an insulation function of an electrical circuit is lost and an accident fault, such as a ground fault or a short circuit, is caused by an intrusion of a small animal or a foreign material, which is not expected, an insulation deterioration by an aged usage, or instrument damage caused by an expected great earthquake.

In particular, when an internal short circuit fault of an enclosed device, such as switchgear, is caused, a large electric current arc is caused, and a plasma state at 10000° C. through 20000° C. is caused at a neighborhood of the arc, so that a neighboring metal or insulation material is partly evaporated. Moreover, a temperature of gas having an insulation capability, such as air neighboring the arc, is instantly raised at a high temperature, and the gas is expanded, and a pressure in the device is set as a very high pressure.

In general, a pressure discharging device is provided in switchgear or the like, and metal gas and insulation material cracked gas, which are evaporated within roughly 10 millisecond, and high pressure gas having an insulation capability, which is thermally expanded, are discharged to the outside of the device, whereby it is prevented that the switchgear is broken. However, when the fault is continued, the large electric current arc is continuously caused, so that a failure neighboring the arc in the device is increased.

An elimination of an electric fault, which is caused in the above-described electric power receiving and transforming system, is performed by using an electric power breaker which is provided in order to protect the electric circuit. However, the electric power breaker detects the fault and separates a failure electric circuit in accordance with an operation of the breaker, and roughly 100 millisecond or more time is required until the arc of the switchgear is removed. In the above-described case, damage of the power receiving and transforming system is large, and it is estimated that damage, by which a device cannot be recycled, is caused in the device which is a cause of the fault.

In order to counter the above-described problem, after an electric fault, such as a ground fault or a short circuit, is caused, there is a suggested method by which a fault electric current is detoured and passed to the earth within a very short time by using a grounding energization circuit having an impedance which is very lower than an impedance of a fault circuit, and there is a suggested high-speed closing device for using in the grounding energization circuit, by which an arc at a fault portion is disappeared within a short time, and a short circuit closing operation is performed within a short time (for example, refer to Patent Document 1 and Non-patent Document 1).

In a high-speed closing device which is described in Patent Document 1 and Non-patent Document 1, one contact is formed between phases of an electric circuit or between electrodes which connects the electric circuit and the earth. When one contact is formed, it is required that space of which insulation distance is wider than an insulation distance by which a discharge or the like is not caused between a contact of a movable contactor and a fixed contactor terminal, is maintained, and it is required that a wide distance between electrodes is maintained. When the wide distance between the electrodes is maintained, a shift distance of the movable contactor for connecting between the electrodes is extended, and a time length, until a short circuit and closing operation is performed, is extended. In order to counter the problem, there is a suggested high-speed closing device in which two contacts are formed between phases of an electric circuit or between electrodes which connects the electric circuit and the earth, and a distance between each of the electrodes is shortened, and a short circuit and closing operation can be performed within a short time (for example, refer to Patent Document 2).

CONVENTIONAL ART DOCUMENT

Patent Document

Patent Document 1: Japanese Patent Publication No. 5254340
Patent Document 2: Japanese Patent Publication No. 34322236

Non-Patent Document

Non-patent Document 1: UFES S3-Speed, Safety, Savings (ABB catalog)

SUMMARY OF THE INVENTION

Problems to be Solved by the Invention

In a high-speed closing device which is described in Patent Document 1 and Non-patent Document 1, one contact is formed between phases of an electric circuit or between electrodes which connects between the electric circuit and the earth. In this case, a distance between a contact of a movable contactor and a contact of a fixed contactor is corresponding to all voltages between electrodes, and it is required that an insulation distance, which is longer than an insulation distance by which a discharge or the like is not caused, is maintained. When the contact of the movable contactor and the contact of the fixed contactor are disposed in a vacuum, although an insulation distance of the contacts can be shortened in comparison with aerial contacts or the like, when a high voltage is applied between the electrodes, it is required that a long distance is maintained in accordance with the high voltage.

When a distance between the contact of the movable contactor and the contact of the fixed contactor is extended, a shift distance of the movable contactor for connecting between the electrodes is extended, and after a closing operation is started, a time length, until a short circuit closing operation of a circuit is performed, is also extended.

Moreover, in a high-speed closing device which is described in Patent Document 1, it is also required that a metal film is cut in accordance with a closing operation of the movable contactor. In this case, there is a case in which the closing operation of the movable contactor is delayed, and a time length, until the short circuit closing operation of the circuit is performed, is more extended, and a variation of a short circuit closing operation time is extended in accordance with a manufacture variation of the metal film. When the movable contactor and a piston for driving are shifted, there is a problem in that a closing operation of the movable contactor is delayed when the movable contactor is slid and contacted between peripheral components, and a long time is required until a short circuit closing operation is operated.

An example, in which two contacts are formed between phases of an electric circuit or between electrodes which connects the electric circuit and the earth, is described in Patent Document 2. As described above, two contacts are provided in series, whereby an insulation distance, which is a distance between a contact of a movable contactor and a contact of a fixed contactor, can be shortened, and a shift distance of the movable contactor can be shortened when a short circuit closing operation is performed. However, in Patent Document 2, the movable contactor performs an open/close operation in accordance with a mechanical closing operation, and there has been a problem in that a sufficient speed cannot be maintained, and it is difficult that a time length, until both movable contactors start a closing operation and a short circuit closing operation is performed, is shortened.

Means for Solving Problems

A high-speed closing device of the present invention includes a first fixed contactor which is made from a conductive material; a second fixed contactor which is made from a conductive material, and is faced to the first fixed contactor so as to be arranged; and a movable contactor, of which tip is made from a conductive material, which includes a hollow hole, in which an opposite side of the tip is opened, at an inner portion, and is separated from the first fixed contactor and the second fixed contactor with a distance being longer than an insulation distance so as to be arranged before the high-speed closing device is closed, and inserts the tip between the first fixed contactor and the second fixed contactor after the high-speed closing device is closed, and electrically connects the first fixed contactor and the second fixed contactor.

Moreover, a high-speed closing device of the present invention includes a first movable contactor which is made from an insulation material having a hollow cylindrical shape and includes an opening portion at one end portion and a closing portion at the other end portion; and a second movable contactor which is made from an insulation material having a hollow cylindrical shape and includes an opening portion at one end portion and a closing portion at the other end portion; wherein a movable contactor connection component in which the opening portion of the second movable contactor is inserted to the opening portion of the first movable contactor in such a way that the opening portions have a nest configuration; and a first fixed contactor, which is made from an insulation material and is faced to the closing portion of the first movable contactor with a constant distance when the first fixed contactor is not operated; and a second fixed contactor, which is made from an insulation material and is faced to the closing portion of the second movable contactor with a constant distance when the second fixed contactor is not operated; and a gas generating portion, which is arranged at an hollow portion which is formed at inner portion of the movable contactor connection component, are included.

Effects of the Invention

In the high-speed closing device of the present invention, two contacts are provided in series, whereby an insulation distance between a contact of a movable contactor and a contact of a fixed contactor can be shortened, and a shift distance of the movable contactor can be shortened when a short circuit closing operation is operated. Moreover, the high-speed closing device is operated in accordance with a pressure variation caused by a gas generating portion which is disposed at a hollow portion of two movable contactor, and a closing operation of the contacts is performed, so that a connection between phases or grounding between the earth and the high-speed closing device can be rapidly performed when an electric fault is caused.

MODE FOR CARRYING OUT THE INVENTION

In explanations and each of the drawings according to embodiments, parts having the same symbols refer to the same or equivalent parts.

Embodiment 1

<Configuration of a High-speed Closing Device>

Figure 1:
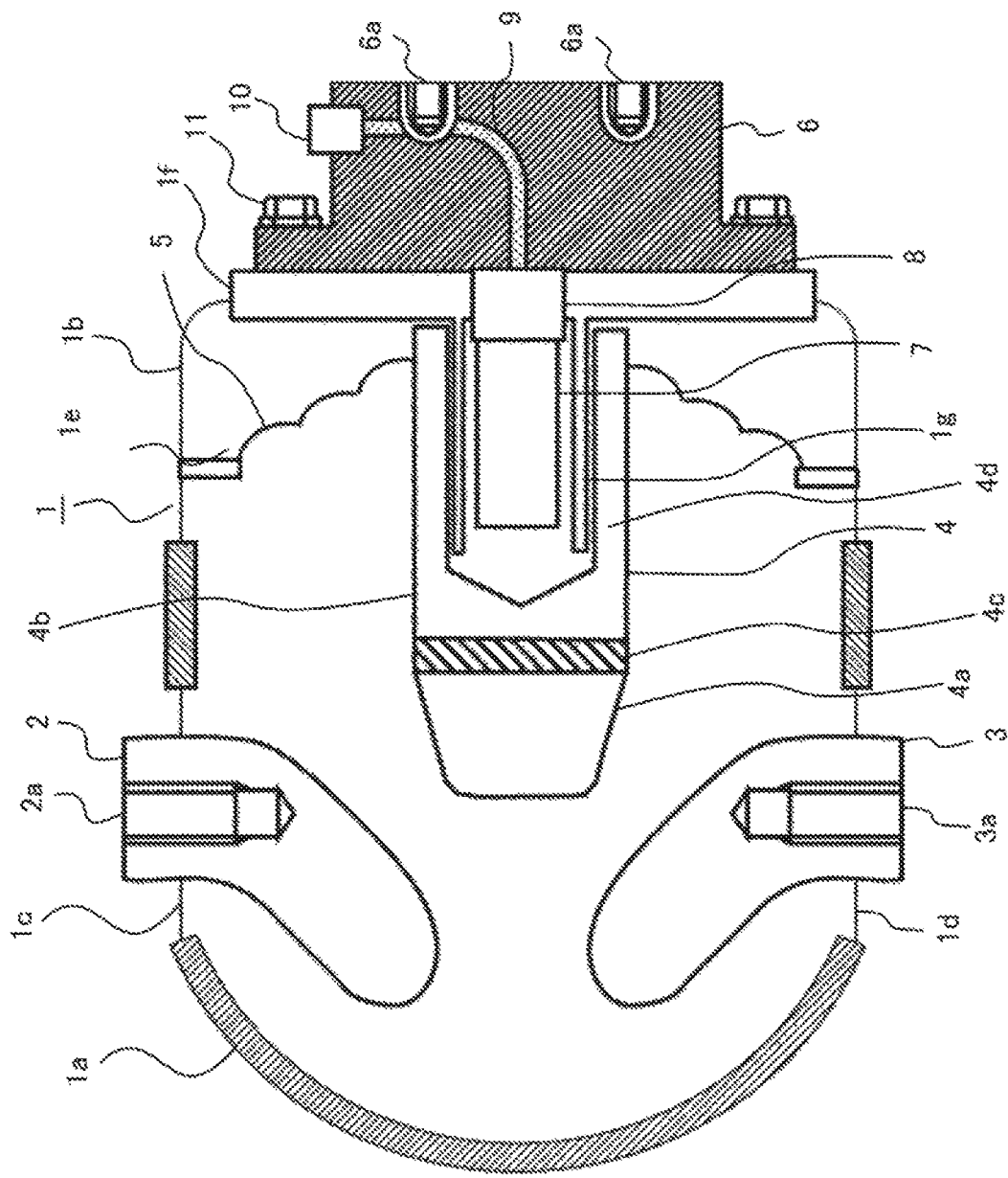
FIG. 1 is a schematic and cross-sectional view illustrating a high-speed closing device (before operation) according to Embodiment 1 of the present invention.
Figure 2:
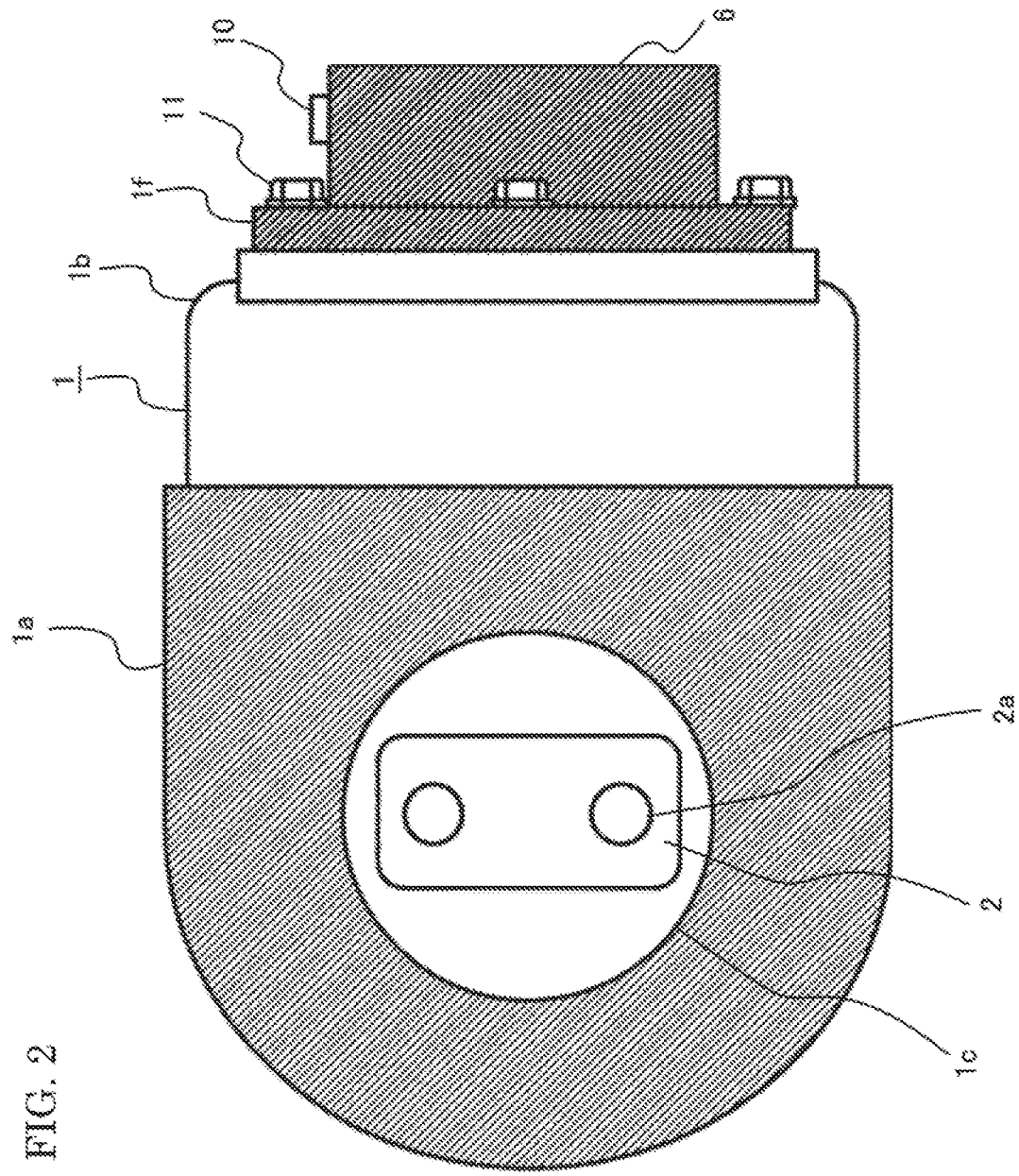
FIG. 2 is a plane view illustrating the high-speed closing device according to Embodiment 1 of the present invention.

A configuration of a high-speed closing device according to Embodiment 1 will be explained by using FIG. 1 and FIG. 2. In the high-speed closing device which is indicated in Embodiment 1, one movable contactor is operated between two fixed contactors so as to close a circuit, and FIG. 1 is a cross-sectional view illustrating the high-speed closing device according to Embodiment 1 of the present invention. FIG. 2 is a plane view illustrating the high-speed closing device according to Embodiment 1 of the present invention.

An outer portion of a vacuum case 1 is formed by using an insulating portion 1a, such as ceramic, and a metal case 1b, which is formed by using stainless material, composing a part of the vacuum case 1. Moreover, a metal plate 1c is used at a part on which a vacuum hermetic connection of a first fixed contactor 2 is performed to the vacuum case 1 by using a brazing or the like, and a metal plate 1d is used at a part on which a vacuum hermetic connection of a second fixed contactor 3 is similarly performed. An inner portion of the metal case 1b is composed of a partition frame 1e, on which a vacuum hermetic connection is performed, and a flange 1f which is fixed to the metal case 1b.

The first fixed contactor 2 is made from a conductive material such as a copper, and an electric current of, for example, several tens of kA can be passed for a few seconds. The first fixed contactor 2 includes an engaging scree hole 2a by which the first fixed contactor 2 is connected to a system electric circuit. The second fixed contactor 3 is similarly made from a copper as the first fixed contactor 2, and an engaging scree hole 3a, by which the second fixed contactor 3 is connected to the system electric circuit, is formed.

A movable contactor 4 includes a closing contact portion 4a, which energizes and contacts the first fixed contactor 2 and the second fixed contactor 3 in a bridging state, at a tip of the movable contactor 4. Moreover, a slide portion 4b of the movable contactor 4 and an insulating portion 4c, which connects the closing contact portion 4a and the slide portion 4b, are included, and a slide guide portion 4d, which assists a shift operation of the movable contactor 4, is formed at an inner portion of the slide portion 4b. A fixed guide portion 1g, which is formed at the flange 1f, is inserted to the slide guide portion 4d, whereby the shift operation of the movable contactor 4 is assisted.

A vacuum hermetic connection for a cylinder outer surface of the slide portion 4b of the movable contactor 4 is performed on the diaphragm 5, and a vacuum hermetic connection for an outer circumference of the diaphragm 5 is performed on the partition frame 1e which is formed at the vacuum case 1. Therefore, in FIG. 1, a left side of the diaphragm 5 of the vacuum case 1 is vacuum portion, and a right side is an aerial room, and the outside air is ventilated at a connecting portion between the metal case portion 1b of the vacuum case 1 and the flange 1f, or at a portion of the flange 1f.

The insulating portion 4c has an insulating capability in order to realize that a fault electric current is not divided and flowed via the closing contact portion 4a of the movable contactor 4 when the fault electric current is passed through a passage which links the first fixed contactor 2, the closing contact portion 4a of the movable contactor 4, and the second fixed contactor 3.

The movable contactor 4 is attached in such a way that the slide guide portion 4d of the movable contactor 4 is overlaid on the fixed guide portions 1g which is formed on the flange 1f. A gas generating portion 7 and an initiation device 8 of the gas generating portion 7 are attached between the fixed guide portion 1g and the movable contactor 4. The gas generating portion 7 is a device which generates high-pressure gas in accordance with a chemical reaction of a gunpowder or the like, and the initiation device 8 is corresponding to an ignition device when a gunpowder is used for the gas generating portion 7.

A signal transmission means, such as an optical fiber 9, which transmits an initiation signal, is linked to the initiation device 8, and a connector 10 is installed and fixed to a mount 6. The mount 6 is fixed to the flange 1f by using an engagement component 11, and moreover, an engagement screw hole 6a is formed at the mount 6, and the high-speed closing device is fixed to a device, such as switchgear, by using the engagement screw hole 6a.

FIG. 2 is a plane view illustrating the high-speed closing device, which is indicated in FIG. 1, according to Embodiment 1, and FIG. 2 indicates an arrangement of the insulating portion 1a, the metal case portion 1b, and the metal plate 1c of the vacuum case 1, and the first fixed contactor 2. The metal plate 1c is used in order to easily perform work when a vacuum hermetic connection of the first fixed contactor 2 to the vacuum case 1 is performed by using a brazing or the like, and when there is no problem for a process, the first fixed contactor 2 may be directly attached to the vacuum case 1 without using the metal plate 1c. The metal plate 1d is used at a back surface of the metal plate 1c of the vacuum case 1, and when there is no problem for a process of the metal plate 1d, which is similar to a process of the metal plate 1c, it is not required that the metal plate 1d is used.

<Closing Operation of the High-speed Closing Device>

Figure 3:
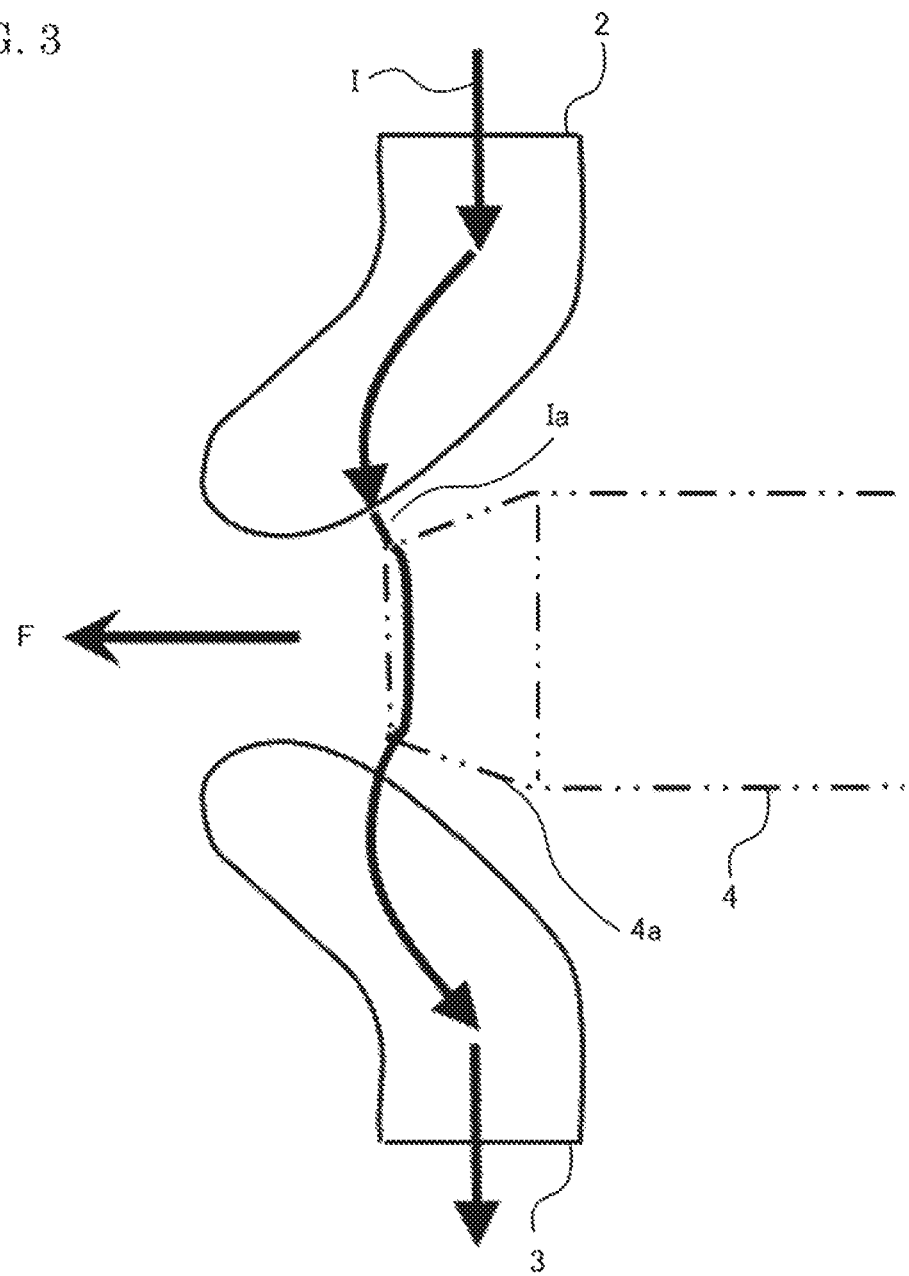
FIG. 3 is a view illustrating a direction of an electromagnetic force which is caused between a movable contactor and a fixed contactor in the high-speed closing device according to Embodiment 1 of the present invention.
Figure 4:
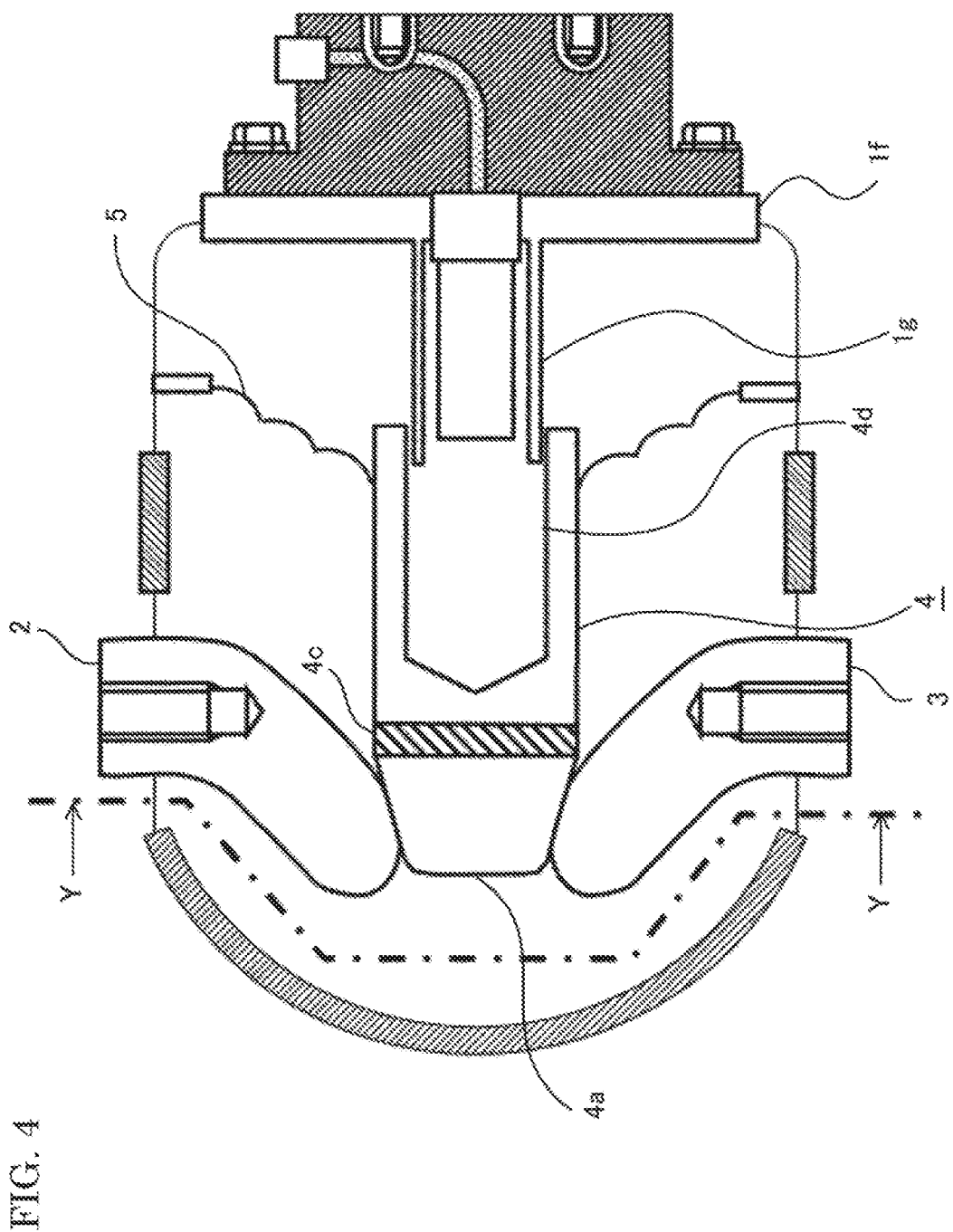
FIG. 4 is a schematic and cross-sectional view illustrating the high-speed closing device (after operation) according to Embodiment 1 of the present invention.
Figure 5:
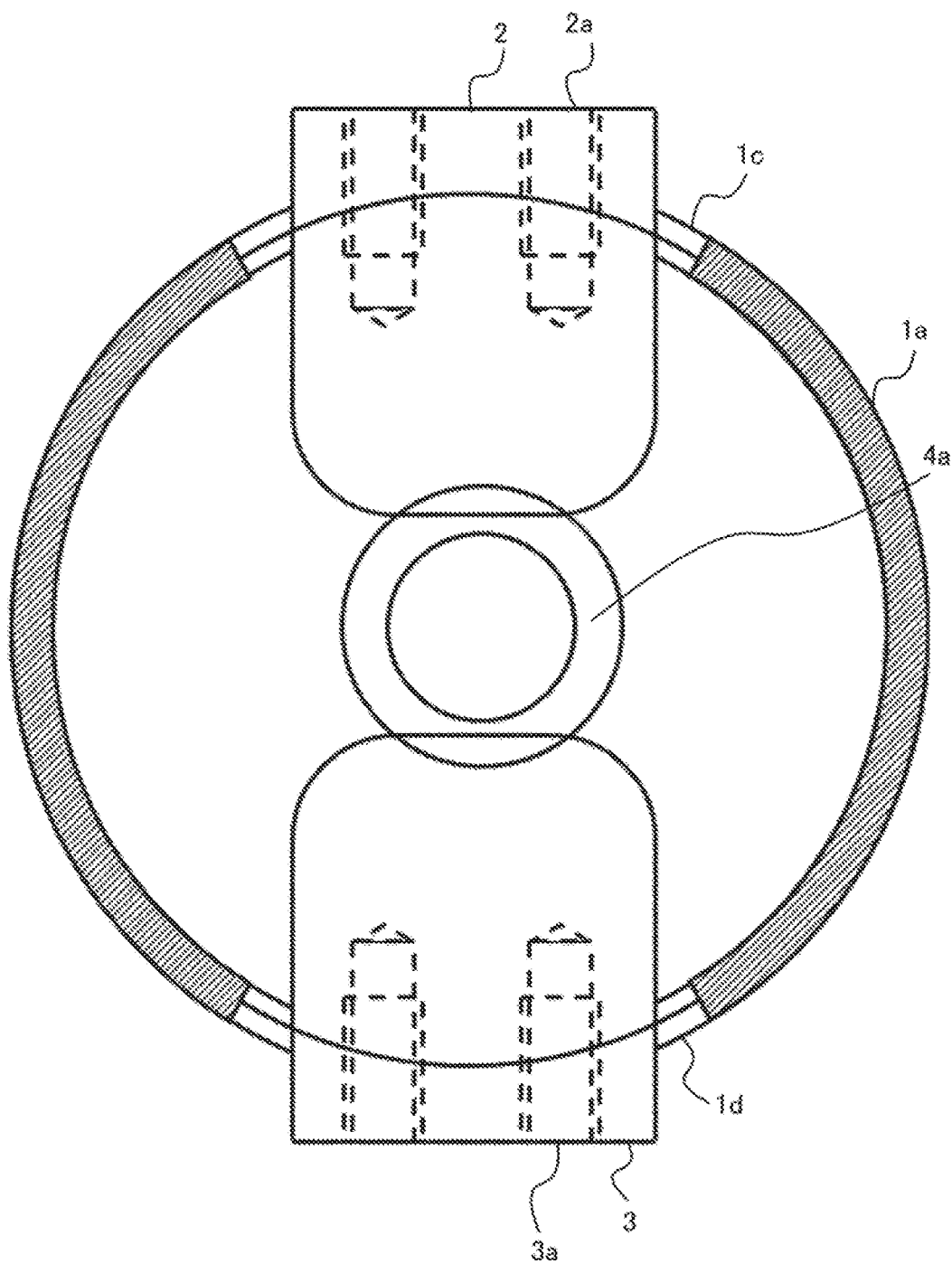
FIG. 5 is a cross-sectional view illustrating the high-speed closing device along "Y-Y" line, which is indicated in FIG. 4.

A closing operation of the high-speed closing device according to Embodiment 1 will be explained by using FIG. 1, FIG. 3, FIG. 4, and FIG. 5, which are used for explaining the configuration of the high-speed closing device. FIG. 3 is an explanatory view illustrating a direction of an electromagnetic force just before the movable contactor 4 is contacted to the first fixed contactor 2 and the second fixed contactor 3 in the high-speed closing device according to Embodiment 1, and FIG. 4 is a cross-sectional view illustrating the high-speed closing device according to Embodiment 1 after the high-speed closing device is closed, and FIG. 5 is an arrow seeing view along a "Y-Y" cross section in FIG. 4.

In FIG. 1, the first fixed contactor 2 is connected to an electric circuit of one phase, and the second fixed contactor 3 is connected to an electric circuit of the other phase. Before the high-speed closing device is closed, the movable contactor 4 is separated from the first fixed contactor 2 and the second fixed contactor 3 with a distance, at which an insulating capability is maintained, and is held at a position corresponding to the diaphragm 5.

When an electric fault is caused between phases at an electric circuit, a signal is transmitted from a fault detector (not illustrated) by a transmission means such as, for example, the optical fiber 9, and the initiation device 8 is initiated via the connector 10 and the optical fiber 9, and the gas generating portion 7 is operated. High-pressure gas, which is generated from the gas generating portion 7, is filled in space in the movable contactor 4, and the slide guide portion 4d of the movable contactor 4 is shifted along the fixed guide portion 1g which is formed at the flange 1f of the vacuum case 1, whereby the high-pressure gas is extruded in a left direction in FIG. 1.

In this case, the diaphragm 5 is deformed in accordance a shift operation of the movable contactor 4, and when a deformation amount exceeds a constant value and passes through a dead point, the diaphragm 5 is reversed, and a stress, which is accumulated by the deformation, is rapidly diverged. The movable contactor 4 is rapidly driven by initial acceleration activation in accordance with a generation of the high-pressure gas of the gas generating portion 7, and by an influence of the stress which is diverged in accordance with the reverse of the diaphragm 5.

As illustrated in FIG. 3, the movable contactor 4 is closed between the first fixed contactor 2 and the second fixed contactor 3, and an electric current I is flown just before the movable contactor 4 is contacted to the first fixed contactor 2 and the second fixed contactor 3. A pre-arc electric current Ia is passed through a gap between the first fixed contactor 2 and the closing contact portion 4a of the movable contactor 4, and a gap between the closing contact portion 4a of the movable contactor 4 and the second fixed contactor 3, and an acceleration activity is supplied to the movable contactor 4 by an electromagnetic force F, and moreover, a closing speed is increased.

In addition, the diaphragm 5, which is used in this case, uses a configuration, in which steps are concentrically formed as illustrated in FIG. 1, or a configuration in which thin-walled portions are concentrically formed, whereby the reverse of the diaphragm 5 can be caused by using low energy, and a closing time of the movable contactor 4 can be more shortened.

FIG. 4 indicates a state in which the movable contactor 4 reaches a portion between the first fixed contactor 2 and the second fixed contactor 3, and the first fixed contactor 2 and the second fixed contactor 3 are electrically connected in a bridging state via the closing contact portion 4a of the movable contactor 4. Therefore, the diaphragm 5, which is illustrate in FIG. 4, indicates a state in which the diaphragm 5 is reversed in accordance with a shift operation of the movable contactor 4. Moreover, FIG. 5 is an arrow seeing view along a "Y-Y" cross section in FIG. 4, and FIG. 5 indicates a state in which the first fixed contactor 2 and the second fixed contactor 3 are electrically connected via the closing contact portion 4a when the first fixed contactor 2 and the second fixed contactor 3 are observed from a "Y" direction.

It is hypothesized that a distance between the first fixed contactor 2 and the second fixed contactor 3 (an insulation distance between electric circuit poles) is a bottom side of an isosceles triangle, and a distance between the first fixed contactor 2 and the movable contactor 4 and a distance between the second fixed contactor 3 and the movable contactor 4 (an insulation distance between an electric circuit and the earth) are two sides of the isosceles triangle. In this case, it is required that a required dielectric strength satisfies a relation of "a dielectric strength between the electric circuit poles"≥"a dielectric strength between the electric circuit and the earth".

There is a positive correlation between the dielectric strength and the insulation distance, so that the above-described relation may be represented as "an insulation distance between the electric circuit poles"≥"an insulation distance between the electric circuit and the earth", and "a height" is smaller than "a length of a bottom side" in the isosceles triangle in which the above-described relation is satisfied. In other words, a shift distance is short and a high-speed closing can be performed when the movable contactor 4, which is separated with a distance corresponding to "the height" between the first fixed contactor 2 and the second fixed contactor 3, is shifted and connected in comparison with when the movable contactor 4, which is separated from the first fixed contactor 2 with a distance corresponding "the length of the bottom side", is shifted and contacted.

Moreover, there is a hypothesized case in which the mount 6 is made from an insulating material, and a portion, which is structurally connected to the movable contactor 4, is set at a middle electric potential. An insulation distance between the first fixed contactor 2 and the movable contactor 4 and an insulation distance between the second fixed contactor 3 and the movable contactor 4 can be closed to a half distance between the first fixed contactor 2 and the second fixed contactor 3, and a closing time can be more shortened.

When an electric fault is caused, in a facility such as switchgear, the electric fault is detected, and an optical signal of a closing instruction for the high-speed closing device is inputted to the initiation device 8 via the optical fiber 9, and high-pressure gas is instantly generated by initiating the gas generating portion 7. The movable contactor 4 is driven in a left direction in FIG. 1 by the high-pressure gas, and the closing contact portion 4a of the movable contactor 4 and the first fixed contactor 2 are electrically contacted, and the closing contact portion 4a of the movable contactor 4 and the second fixed contactor 3 are electrically connected.

Thereby, an electric circuit, which is connected to the first fixed contactor 2, is connected to an electric circuit, which is connected to the second fixed contactor 3, via the closing contact portion 4a of the movable contactor 4, and the electric circuits are set in a conductive state. As a result, a fault electric current at a fault portion, which is set in an energizing state via a resistance of an arc, is detoured and passed through the high-speed closing device of the present invention, of which impedance is very low, whereby the arc, which is caused at the fault portion, is disappeared.

The high-speed closing device according to Embodiment 1, which is arranged between the phases of the electric circuit and between the electric circuit and the earth, is used, and while the fault electric current is passed through, a protection relay and a breaker of an electric power receiving and transforming system are operated, and an electric circuit at a fault section is separated, whereby the fault ca be removed from the electric power receiving and transforming system.

In the above-described explanations, although the configuration, in which the high-speed closing device according to Embodiment 1 is connected and arranged between the phases of the electric circuit, is mainly explained, even when the first fixed contactor 2 is connected to the electric circuit and the second fixed contactor 3 is connected to an earth line, a similar effect can be realized.

In the high-speed closing device of the present invention, a maximum short current of an electric power system can be passed from a time when an electric fault is caused to a time when a breaker of the electric power system is operated (maximum few seconds in a usual case). Therefore, an influence in accordance with heat and a pressure increment, which are caused by an occurrence of an electric fault in a facility such as switchgear, is continued from a time when the electric fault is caused to a time when the high-speed closing device of the present invention is closed.

Therefore, a fracture condition of the facility such as the switchgear is greatly varied in accordance with a very short time, for example, 1/10 millisecond just after the electric fault is caused. For example, if a time length, between when an electric fault is detected and when an initiation instruction of the high-speed closing device is outputted, is equivalent to a time length in a conventional art, the high-speed closing device according to Embodiment 1 is a high-speed closing device of which closing time is short in principle. Therefore, damage, which is occurred when the electric fault is caused, can be more reduced.

Embodiment 2

Figure 6:
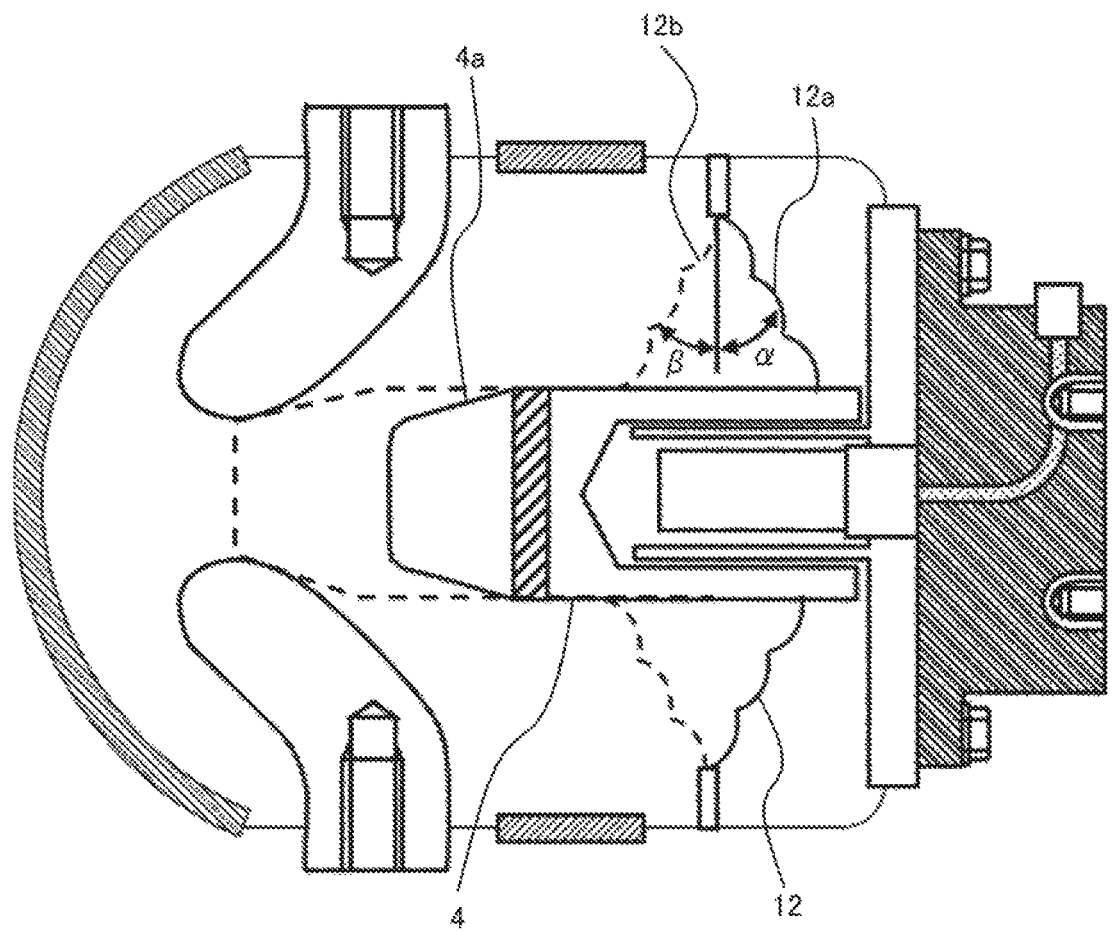
FIG. 6 is a schematic and cross-sectional view illustrating a high-speed closing device according to Embodiment 2 of the present invention.

A high-speed closing device according to Embodiment 2 will be explained by using FIG. 6. FIG. 6 is a schematic and cross-sectional view illustrating the high-speed closing device according to Embodiment 2 of the present invention. The diaphragm 5, which is used in the high-speed closing device according to Embodiment 1, is formed in such a way that the diaphragm 5 is set at a symmetrical position with respect to a dead point before and after a buckling operation of the diaphragm 5 in accordance with an operation of the movable contactor 4.

However, as indicated in FIG. 6, a diaphragm 12 according to Embodiment 2, which is attached in such a way that the diaphragm 5 is set at an unsymmetrical position with respect to a dead point before and after a buckling operation of the diaphragm 12 in accordance with an operation of a movable contactor 4, is different from the diaphragm 5 according to Embodiment 1. In other words, in the diaphragm 12 according to Embodiment 2, the diaphragm 12 is set at a position of a diaphragm 12a (before closing operation), which is indicated by a solid line, before the movable contactor 4 is closed, and the diaphragm 12 is set at a position of a diaphragm 12b (after closing operation), which is indicated by a dashed line, after the movable contactor 4 is closed.

Moreover, when the operation of the diaphragm 12 is explained in detail, before the movable contactor 4 is closed, the diaphragm 12a (before closing operation) is held in a state where an angle α is maintained with respect to a dead point of the buckling, and in a state where the movable contactor 4 is contacted to a flange portion 1f of a vacuum case 1.

In a state where the movable contactor 4 is shifted and closed, the diaphragm 12b (after closing operation) is held at an angle β with respect to the dead point of the buckling, and a contact force, which is required for a first fixed contactor 2 and a second fixed contactor 3, is supplied to a closing contact portion 4a of the movable contactor 4.

In the configuration of the high-speed closing device according to Embodiment 2, in order to more reduce a time when the movable contactor 4 starts a driving operation until the diaphragm 12 reaches the dead point of the buckling, and a buckling reverse is performed, it is effective that the angle α is approached to 0° as much as possible. In this case, closing and driving energy can be reduced, and a closing time can be more shortened.

Embodiment 3

Figure 7:
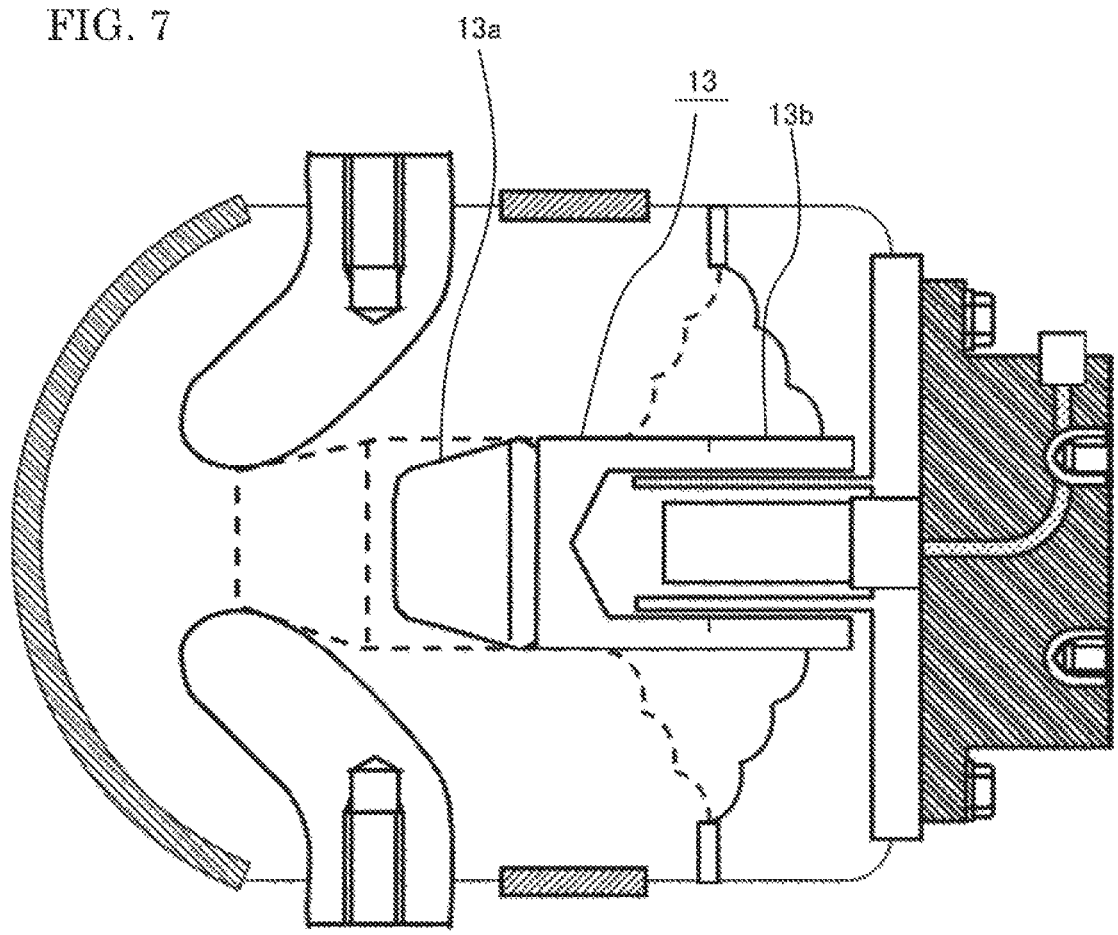
FIG. 7 is a schematic and cross-sectional view illustrating a high-speed closing device according to Embodiment 3 of the present invention.

A high-speed closing device according to Embodiment 3 will be explained by using FIG. 7. FIG. 7 is a schematic and cross-sectional view illustrating the high-speed closing device according to Embodiment 3 of the present invention. The movable contactor 4, which is used in the high-speed closing device according to Embodiment 1, is composed of the closing contact portion 4a, the insulating portion 4c, and the slide portion 4b. However, a movable contactor 13 according to Embodiment 3 is composed of a closing contact portion 13a which is made from a low resistance and conductive material, for example, such as copper, and a slide portion 13b which is made from a material such as, for example, iron or stainless steel, of which resistance is relatively high.

In the high-speed closing device according to Embodiment 3, although a metal material is used for the slide portion 13b, the metal material has a relatively high resistance, and a plastic, of which material may have a high hermetic capability, can be also used. The movable contactor 13 according to Embodiment 3 can be manufactured with a cheap cost in comparison with the movable contactor 4 including the insulating portion 4c, which is indicated in Embodiment 1, and the high-speed closing device, of which closing time is short, can be obtained with a cheap cost.

Embodiment 4

Figure 8:
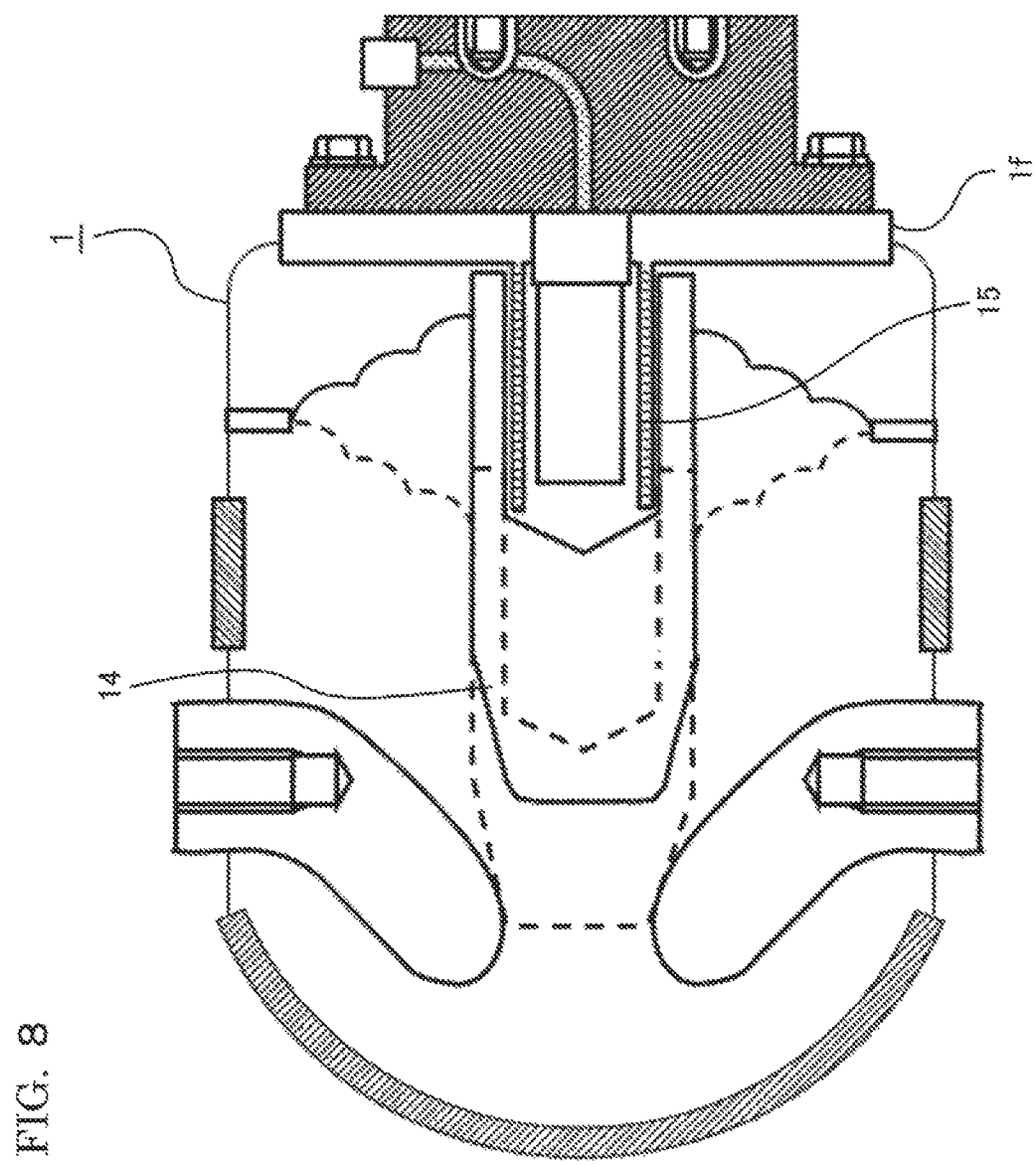
FIG. 8 is a schematic and cross-sectional view illustrating a high-speed closing device according to Embodiment 4 of the present invention.

A high-speed closing device according to Embodiment 4 will be explained by using FIG. 8. FIG. 8 is a schematic and cross-sectional view illustrating the high-speed closing device according to Embodiment 3 of the present invention. The movable contactor 4, which is used in the high-speed closing device according to Embodiment 1, is composed of the closing contact portion 4a, the insulating portion 4c, and the slide portion 4b. However, a movable contactor 14 according to Embodiment 4 is totally made from an identical material, so that the movable contactor 14 can be made by easily processing, for example, a round copper bar.

In the high-speed closing device according to Embodiment 1, the fixed guide portion 1g is formed by using a conductive material, which is identical to a conductive material of the flange 1f, at the flange 1f of the vacuum case 1. However, in the high-speed closing device according to Embodiment 4, it is required that a slide guide portion 15, which is made from an insulating material, is fixed to a flange 1f so as to be used.

In the high-speed closing device according to Embodiment 4, the movable contactor 14 can be made with a cheap cost in comparison with the movable contactor 4, and an insulating material can be used for a fixed guide portion 1g, so that the high-speed closing device, of which closing time is short, can be obtained with a cheap cost.

Embodiment 5

Figure 9:
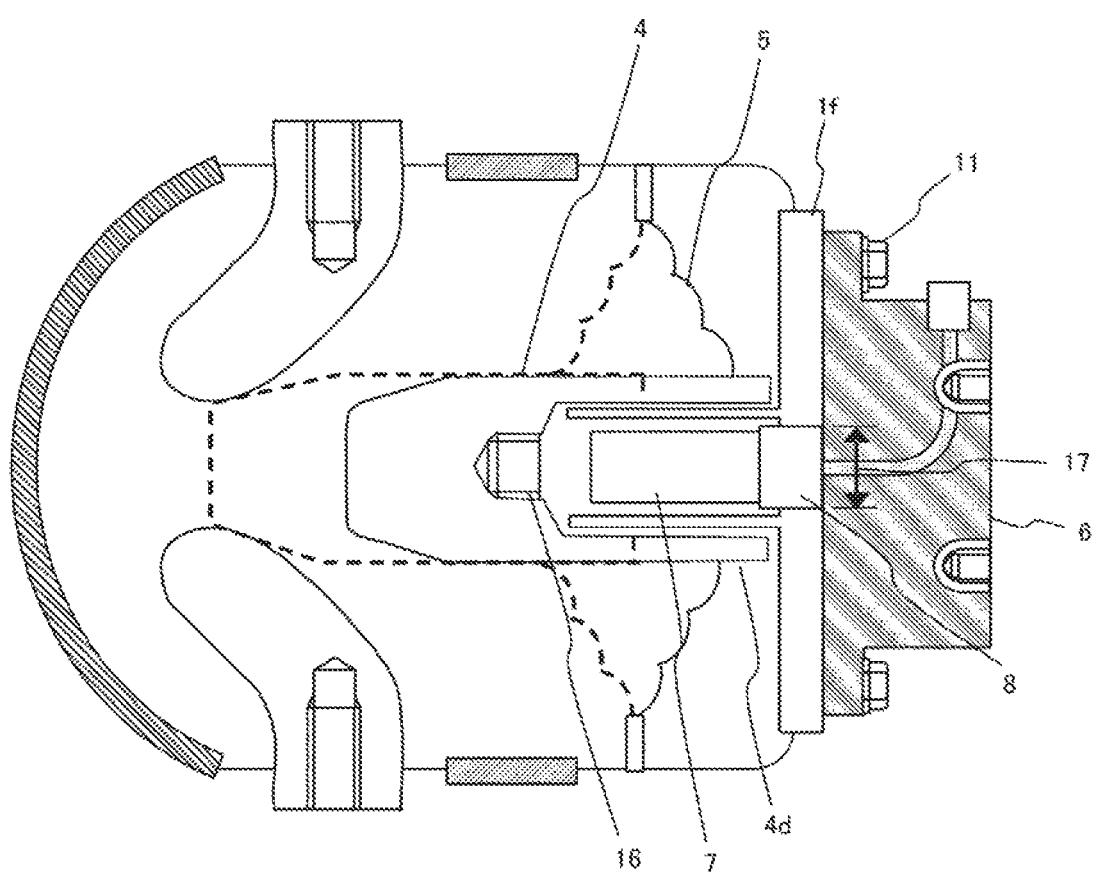
FIG. 9 is a schematic and cross-sectional view illustrating a high-speed closing device according to Embodiment 5 of the present invention.

A high-speed closing device according to Embodiment 5 will be explained by using FIG. 9. FIG. 9 is a schematic and cross-sectional view illustrating the high-speed closing device according to Embodiment 5 of the present invention. In the high-speed closing device according to Embodiment 5, a screw hole 16 is formed at a back of a slide guide portion 4d of a movable contactor 4, and a screw diameter (a valley diameter of a female screw) is smaller than a diameter of an attachment hole 17 of an initiation device 8 which is attached to a flange 1f.

In the high-speed closing device according to Embodiment 5, although the movable contactor 4 uses a configuration in which the screw hole 16 is formed at the back of the slide guide portion 4d, the movable contactor 13, which is used in the high-speed closing device according to Embodiment 3, or the movable contactor 14, which is used in the high-speed closing device according to Embodiment 4, can be used as the movable contactor 4.

When the high-speed closing device is closed, a buckling operation of a diaphragm 5 is performed, and a closing operation of the movable contactor 4 is performed, and after an elimination of an arc is terminated, the movable contactor 4 is shifted to a position which is indicated by a dashed line in FIG. 9. In this state, in order to reuse the high-speed closing device of the present invention, an engagement component 11 of a mount 6 is removed, and a gas generating portion 7 and the initiation device 8 are removed from the flange 1f.

In this state, the attachment hole 17 is formed at the flange 1f, and a tool (not illustrated) is inserted from the attachment hole 17 to the screw hole 16, which is formed at a back of the slide guide portion 4d of the movable contactor 4, and the movable contactor 4 is pulled. By this operation, the buckling operation of the diaphragm 5 is performed at a state before the diaphragm 5 is closed, and the diaphragm 5 can be pulled and backed, and the gas generating portion 7 and the initiation device 8 are newly replaced, whereby the high-speed closing device can be assembled in an original state.

In the high-speed closing device according to Embodiment 5, after one closing operation is performed, the movable contactor 4, the diaphragm 5 and the like can be reassembled in an original state by easy work without breaking down the overall high-speed closing device, and the high-speed closing device, by which a high-speed closing operation can be performed, can be manufactured with a cheap cost.

Embodiment 6
<Configuration of a High-speed Closing Device>

Figure 10:
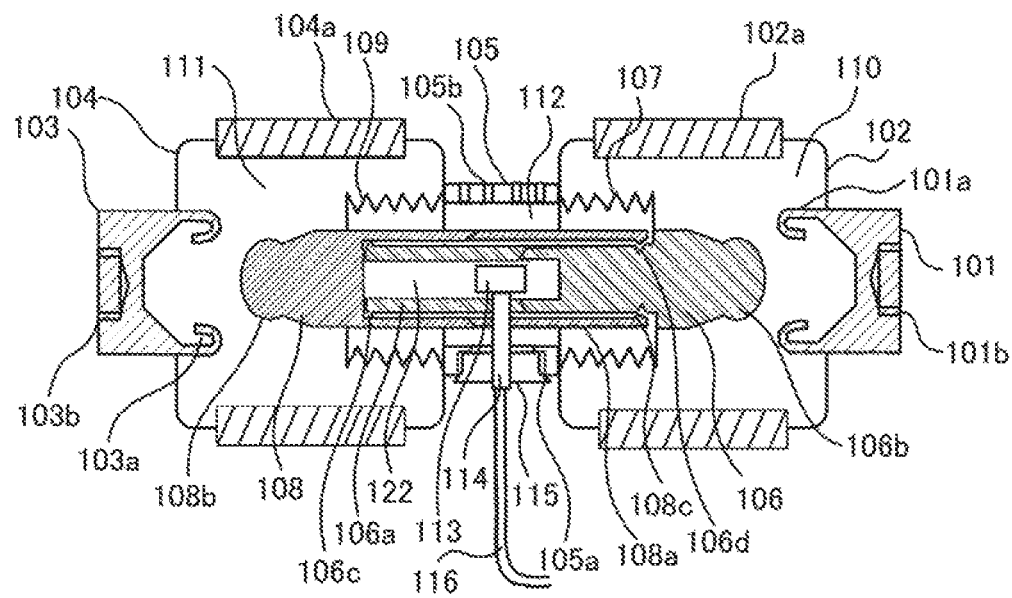
FIG. 10 is a schematic and cross-sectional view illustrating a high-speed closing device (before operation) according to Embodiment 6 of the present invention.

FIG. 10 is a schematic and cross-sectional view illustrating the high-speed closing device according to Embodiment 6. FIG. 10 indicates a state before the high-speed closing device is operated. In the high-speed closing device according to Embodiment 6, it is not performed that the one movable contactor 4 is driven between the first fixed contactor 2 and the second fixed contactor 3, which are indicated in Embodiment 1 through Embodiment 5, and a circuit is closed, and the high-speed closing device has a configuration which is roughly symmetric in right and left directions, and has a configuration in which closing devices are respectively included at right and left positions. Therefore, the configuration of the closing devices, which are symmetrically positions in right and left directions, will be firstly explained by using the closing device which is positioned at right side in FIG. 10.

A first fixed contactor 101 and a first movable contactor 106 are faced and arranged in a state where a constant distance is maintained. The first fixed contactor 101 includes an engagement means 101b, such as a screw hole, by which the first fixed contactor 101 is electrically connected to an electric circuit or the earth, and includes a contact portion 101a by which the first fixed contactor 101 is electrically contacted to the first movable contactor 106 when the closing device is operated. On the other hand, the first movable contactor 106 includes a closing contact portion 106b at a portion which is faced to the first fixed contactor 101. The pair of the first fixed contactor 101 and the first movable contactor 106 are arranged at a first vacuum case 102 having a roughly cylindrical shape, which includes an insulating portion 102a having a cylindrical shape, which is formed by using a ceramic material or the like, and the first fixed contactor 101 and the first movable contactor 106 compose a closing device at one side (right side in FIG. 10). An electric insulation capability of the first fixed contactor 101 and the first movable contactor 106 is maintained by an insulating portion 102a having a cylindrical shape.

A closing device at a left side in FIG. 10 has a basically identical configuration, and a pair of a second fixed contactor 103, which includes a contact portion 103a and an engagement means 103b of the second fixed contactor 103, and a second movable contactor 108, which includes a closing contact portion 108b, are arranged at a second vacuum case 104 having a roughly cylindrical shape, which includes an insulating portion 104a which is formed by using a ceramic material having a cylindrical shape. The second fixed contactor 103 and the second movable contactor 108 maintain an electric insulation capability by using the insulating portion 104a having a cylindrical shape.

Each of the first movable contactor 106 and the second movable contactor 108 is formed by using a conductor having a roughly cylindrical shape, and although an operation method is described later, the closing contact portion 106b and the closing contact portion 108b are processed in a such a way that the closing contact portion 106b and the closing contact portion 108b are easily contacted to the contact portion 101a of the first fixed contactor 101 and the contact portion 103a of the second fixed contactor 103 when the closing contact portion 106b and the closing contact portion 108b are operated, and tip portions have a roughly spherical shape. Each of the movable contactor 106 and the movable contactor 108, which has a cylindrical shape, has a hollow configuration, and each of opposite sides of the closing contact portion 106b and the closing contact portion 108b is opened.

Shapes of aperture sides having a roughly cylindrical shape of the first movable contactor 106 and the second movable contactor 108 are different from each other, and the first movable contactor 106 and the second movable contactor 108 have a so-called nest configuration in which one movable contactor is disposed at an inner portion of the other movable contactor. In FIG. 10, although a nest configuration is formed in such a way that the left second movable contactor 108 is positioned at the outside, and the right first movable contactor 106 is positioned at the inside, it is not limited that any of the left and right movable contactors is positioned at the outside or the inside, and it is suitable that the movable contactors are configured in such a way that one movable contactors is positioned at the outside, and the other movable contactors is positioned at the inside. In addition, there is a case in which a configuration, in which two movable contactors are connected in a nest state, is called as a movable contactor connection component.

In FIG. 10, the first movable contactor 106 and the second movable contactor 108 (movable contactor connection component), which have a nest configuration in which the second movable contactor 108 is positioned at the outside, and the first movable contactor 106 is positioned at the inside, are indicated. Portions, at which the first movable contactor 106 and the second movable contactor 108 are overlapped, are called as a slide contact portion 106a and a slide contact portion 108a. A first cylinder bellows 107 is formed at an outer circumferential portion of the slide contact portion 106a, and a second cylinder bellows 109 is formed at an outer circumferential portion of the slide contact portion 108a. Inner portions of the first vacuum case 102 and the second vacuum case 104 are set as a vacuum state, so that the outer circumferential sides of the cylinder bellows are set as a vacuum state, and the insides of the cylinder bellows are set as an atmospheric pressure state (aerial portion 112) in the first cylinder bellows 107 and the second cylinder bellows 109. Therefore, the first cylinder bellows 107 and the second cylinder bellows 109 are closely contacted to the movable contactor connection component so as to be arranged by a hermetic connection.

The slide contact portion 106a and the slide contact portion 108a are arranged at a concentric hollow portion in such a way that the slide contact portion 106a and the slide contact portion 108a are slid and contacted each other. A tip outer diameter portion (protrusion portion) 106c of the slide contact portion 106a of the first movable contactor 106 is contacted to an inner surface of a hollow portion of the slide contact portion 108a of the second movable contactor 108, and a tip inner diameter portion 108c of the slide contact portion 108a of the second movable contactor 108 is contacted to an outer surface of the slide contact portion 106a of the first movable contactor 106 so as to be arranged. Moreover, in order to fix the first movable contactor 106 and the second movable contactor 108 before the slide contact portion 106a is operated, a notch portion 106d, by which the tip inner diameter portion 108c of the second movable contactor 108 is held, is formed at the slide contact portion 106a. A contact operation of the tip outer diameter portion 106c and the slide contact portion 108a, and a contact operation of the tip inner diameter portion 108c of the slide contact portion 106a are contributed as a guide for a linear slide operation of the first movable contactor 106 and the second movable contactor 108, and moreover, an energization state between the first movable contactor 106 and the second movable contactor 108 is maintained.

In the high-speed closing device of the present invention, as described later, a fault electric current is ejected to the earth or the like by connecting the first fixed contactor 101 and the second fixed contactor 103, and it is important that the left and right closing devices are concurrently and constantly operated, and in order to realize equalization of a shared voltage between two vacuum disconnectors, it is important that a vacuum aerial separation size, which is a vacuum aerial distance between the contact portion 101a of the first fixed contactor 101 and the closing contact portion 106b of the first movable contactor 106, and a vacuum aerial separation distance between the contact portion 103a of the second fixed contactor 103 and the closing contact portion 108b of the second movable contactor 108, and sizes of the first cylinder bellows 107 and the second cylinder bellows 109 are set as all identical design specifications (a shape, a size, and a dielectric constant or the like of an insulating material), and an imbalance of the high-speed closing device is improved by inhibiting a variation, and the high-speed closing device can be downsized.

The first vacuum case 102 and the second vacuum case 104 are linked and fixed by an aerial case 105 having a cylindrical shape Space between the first fixed contactor 101 and the second fixed contactor 103 and space between the first movable contactor 106 and the second movable contactor 108 in the first vacuum case 102 and the second vacuum case 104 are formed as a first vacuum portion 110 and a second vacuum portion 111, and an electrical discharge or the like, which is described later, is prevented when the first movable contactor 106 and the second movable contactor 108 are operated. A gas generating portion 113 is disposed at a hollow portion 122 of the slide contact portion 106a and the slide contact portion 108a, at which the first movable contactor 106 and the second movable contactor 108 are formed in a nest state, and an initiation device 114, which penetrates the aerial case 105 so as to be connected to the gas generating portion 113, and an optical fiber 116 for controlling the initiation device 114 are connected.

The gas generating portion 113 raises a pressure in hollow portion 122 of the movable contactor connection component, which is formed in a nest state, by a pressure rise in accordance with gas generation. Thereby, the first movable contactor 106 is shifted in a right direction in FIG. 10 in a state where the tip outer diameter portion 106c, which is formed at the slide contact portion 106a of the first movable contactor 106, is used as a guide, and the second movable contactor 108 is shifted in a left direction in FIG. 10 in a state where the tip inner diameter portion 108c, which is formed at the slide contact portion 108a of the second movable contactor 108, is used as a guide. In addition, a device, which generates gas in accordance with a chemical change of a gunpowder or the like so as to cause a pressure variation, and a device, such as a gas bomb, which generates gas in accordance with a valve operation so as to cause a pressure variation, can be used.

In this case, the aerial case 105, the initiation device 114 or the like can be fixed by using a fixing hardware 115, a screw hole 105a or the like, which is formed at the aerial case 105, and it is suitable that an easy attachment method is used in order to easily replace the gunpowder, and to easily attach the gas generating portion. It is required that the gunpowder, the gas bomb or the like in the gas generating portion is replaced in accordance with aged deterioration or the like, so that it is important that an easy arrangement and replace method is used in a case where a replacement is supposed.

It is suitable that the optical fiber 116, which is a signal cable by which an operation signal is rapidly transmitted, is used for the initiation device 114, so that it is important in this case that the initiation device 114, which is initiated by using an optical signal, is used. In addition, although it is not illustrated in detail that the first movable contactor 106 and the second movable contactor 108 uses the gas generating portion 113, such as a gunpowder, when the movable contactors are operated, and the first movable contactor 106 and the second movable contactor 108 are shifted in accordance with a pressure variation in a state where the initiation device 114 is used as a guide, so that s slit for the guide is formed.

<Operation of the High-speed Closing Device>

Figure 11:
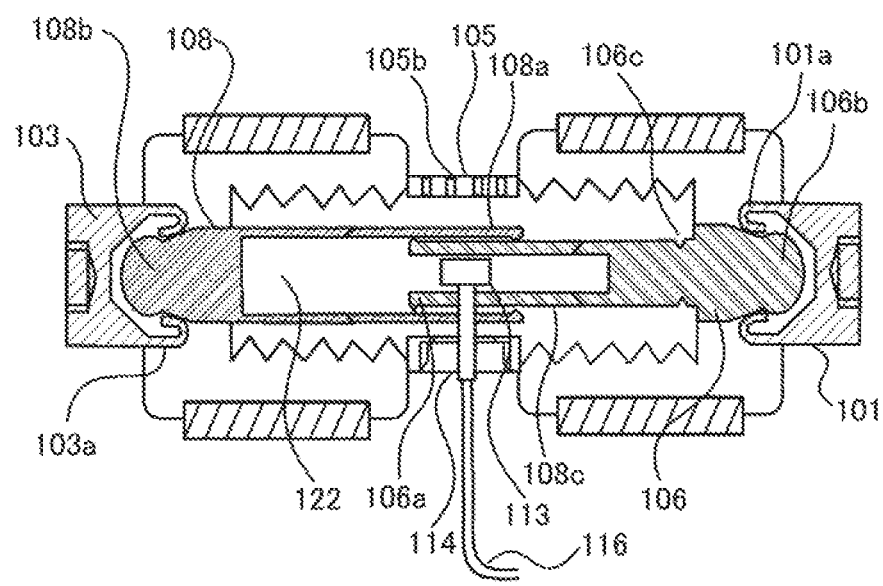
FIG. 11 is a schematic and cross-sectional view illustrating the high-speed closing device (after operation) according to Embodiment 6 of the present invention.

FIG. 11 is a schematic and cross-sectional view illustrating the high-speed closing device according to Embodiment 6. FIG. 11 indicates a state after the high-speed closing device, which is illustrated in FIG. 10, is operated. A configuration of the high-speed closing device (after operation) according to Embodiment 6, and a closing operation of the high-speed closing device will be explained by using FIG. 11.

The high-speed closing device according to Embodiment 6 is controlled by a signal for instructing an operation, and a gunpowder of the gas generating portion 113 is burned by the initiation device 114 via the optical fiber 116, and gas is generated in the hollow portion 122 of the first movable contactor 106 and the second movable contactor 108, which are formed in a nest state. A pressure in the hollow portion 122 is rapidly raised in accordance with a generation of the gas, and then, the slide contact portion 106a of the first movable contactor 106 and the slide contact portion 108a of the second movable contactor 108 are slid, and the first movable contactor 106 and the second movable contactor 108 are respectively shifted to the outside. The first movable contactor 106 is shifted so as to reach the first fixed contactor 101 which is positioned at a right end of the high-speed closing device, and the second movable contactor 108 is shifted so as to reach the second fixed contactor 103 at a left side. The closing contact portion 106b of the first movable contactor 106 is connected to the contact portion 101a of the first fixed contactor 101, and the closing contact portion 108b of the second movable contactor 108 is connected to the contact portion 103a of the second fixed contactor 103.

When the first movable contactor 106 is connected to the first fixed contactor 101, and the second movable contactor 108 is connected to the second fixed contactor 103, an electric current is flowed, so that an electromagnetic force is acted to the contact portion 101a of the first fixed contactor 101 and to the contact portion 103a of the second fixed contactor 103 in an inside direction of a circumference, and a force, by which the closing contact portion 106b of the first movable contactor 106 and the closing contact portion 108b of the second movable contactor 108 are held, is increased, and a closing state is certainly maintained, whereby constant energization can be maintained.

A vent hole 105b toward the outside air is provided at the aerial case 105, and even when a pressure in the aerial case 105 is lower than a peripheral pressure while the first movable contactor 106 and the second movable contactor 108 are shifted, an air flow toward the outside air is maintained via the vent hole 105b, and it is prevented that a shifting and closing speed of the first movable contactor 106 and the second movable contactor 108 is limited. In Embodiment 6, although it is assumed that the high-speed closing device is held in air, it is needless to say that even when the high-speed closing device is held so as to be used in insulation gas, such as SF6, except for air, the vent hole 105b, which is formed at the aerial case 105, is effectively functioned.

<Effect of the High-speed Closing Device>

In a case of the first fixed contactor 101 and the second fixed contactor 103 of the high-speed closing device which is indicated in Embodiment 6, for example, the first fixed contactor 101 is connected to an electric circuit of one phase, and the second fixed contactor 103 is connected to an electric circuit of the other phase or the earth. Therefore, the first movable contactor 106 and the second movable contactor 108 are set at a middle electric potential of an interphase or earth electric potential, which is applied between the first fixed contactor 101 and the second fixed contactor 103, and each of half dielectric strengths, which is an electric field strength by which an insulation state can be maintained, is numerically shared by a contact of the first fixed contactor 101 and the first movable contactor 106 and a contact of the second fixed contactor 103 and the second movable contactor 108.

In the high-speed closing device which is actually formed, although there is a case in which each of inter-pole share pressures of two contacts is not an even distribution in accordance with a valuation on manufacture or an arrangement of an attachment ambient electrical circuit of the high-speed closing device, it is suitable that the high-speed closing device has a roughly half inter-pole dielectric strength in comparison with a case in which the contactors are configured by using one contact indicated in Patent Document 1. Even in a high vacuum, a distance between electric poles and a dielectric strength have a positive correlation, so that the contactors of the present invention, which are configured by using two contacts, can have a roughly half distance between the electric poles in comparison with a case in which the contactors are configured by using one contact.

The first movable contactor 106 and the second movable contactor 108 start a movement form a static state and are gradually accelerated, and a velocity of the movable contactors reaches a constant velocity. If it is assumed that acceleration and a constant velocity for reaching a closing device, in which a shift distance of a movable contactor, which is configured by using one contact, is long, is identical to acceleration and a constant velocity for reaching the closing device of the present invention, which is configured by using two contacts, in which a shift distance of the first movable contactor 106 and the second movable contactor 108 is short, even when a shift distance is reduced to a half shift distance, although a time, which is required until a closing operation is performed, is not reduced to a half time, the closing device of the present invention can be closed with a sufficiently short time.

In a facility (not illustrated in FIG. 11) such as switchgear, when an electric fault, such as a ground fault or a short circuit, is caused, an optical signal, by which the electric fault is detected and the high-speed closing device is controlled, is inputted to the initiation device 114 via the optical fiber 116, and gas generating portion 113, which is disposed at an internal portion of the hollow portion 122 in which the first movable contactor 106 and the second movable contactor 108 are formed with a nest configuration, is initiated. The gas generating portion 113 instantly generates high pressure gas, and a pressure in the hollow portion 122 is rapidly raised.

Thereby, the tip outer diameter portion 106c of the first movable contactor 106 and the slide contact portion 108a of the second movable contactor 108, and the tip inner diameter portion 108c of the second movable contactor 108 and the slide contact portion 106a of the first movable contactor 106 are automatically disconnected, and the first movable contactor 106 is shifted in a right direction in FIG. 10, and the second movable contactor 108 is shifted in a left direction in FIG. 10, whereby the first movable contactor 106 and the second movable contactor 108 are contacted to the first fixed contactor 101 and the second fixed contactor 103, to which each of the movable contactors is faced (refer to FIG. 11).

An electric current is passed through the contact portion 101a of the first fixed contactor 101 and the contact portion 103a of the second fixed contactor 103, whereby an electromagnetic force, which holds the closing contact portion 106b, which is positioned at a tip of the first movable contactor 106, and the closing contact portion 108b, which is positioned at a tip of the second movable contactor 8, is acted, and a contact state of the first fixed contactor 101 and the first movable contactor 106 and a contact state of the second fixed contactor 103 and the second movable contactor 108 are more ensured. Moreover, the closing contact portion 106b, which is a tip of the first movable contactor 106, and the closing contact portion 108b, which is a tip of the second movable contactor 108, are inserted into the contact portion 101a of the first fixed contactor 101 and the contact portion 103a of the second fixed contactor 103, whereby when an energization contact operation is performed, and even when a closing operation is performed and the closing contact portion 106b and the first fixed contactor 101, and the closing contact portion 108b and the second fixed contactor 103 are smashed and rebounded, a constant energization contact can be maintained.

The first movable contactor 106 and the second movable contactor 108 are electrically contacted via each of the slide contact portion 106a and the slide contact portion 108a, and an energization state is maintained. As a result, an energization state between the first fixed contactor 101 and the second fixed contactor 103 can be constantly maintained by closing the high-speed closing device, and an electric current of an electric fault, which is caused at an electric circuit of a facility such as switchgear, is detoured, and is passed through the high-speed closing device of the present invention, which is provided at the same electric circuit and has a very low impedance, and an arc, which is caused at a fault point, is extinguished.

While the fault electric current is passed through by using the high-speed closing device of the present invention, which is disposed between the phases of the electric circuit and between the electric circuit and the earth, a protection relay and a breaker of an electric power system are operated, and the electric circuit at a fault section is separated, whereby the fault is removed from the electric power system.

In the high-speed closing device of the present invention, a maximum short circuit current of the electric power system can be passed during from a time when a fault is caused to a time when a breaker is operated (maximum few seconds in a usual case), so that an influence, which is caused by heat and pressure increment which are caused by an electric fault generation in a facility such as switchgear, is continued during from a time when a fault is caused to a time when the high-speed closing device of the present invention is closed, and when the high-speed closing device is configured by using two contacts as described in the present invention, shift distances of the first movable contactor 106 and the second movable contactor 108 can be shortened, and the high-speed closing device can be closed with a short time in comparison with a high-speed closing device which is configured by using one contact as described in Patent Document 1 and Non-patent Document 1.

Moreover, in the high-speed closing device of the present invention, the first movable contactor 106 and the second movable contactor 108 are formed with a nest configuration, and the gas generating portion 113 is provided at the hollow portion 122 between the first movable contactor 106 and the second movable contactor 108, so that the first movable contactor 106 can be rapidly connected to the first fixed contactor 101, which is faced to the first movable contactor 106, and the second movable contactor 108 can be rapidly connected to the second fixed contactor 103, which is faced to the second movable contactor 108, in accordance with a pressure increment of the hollow portion 122, which is caused by driving the gas generating portion 113, so that the high-speed closing device can be rapidly closed in comparison with a closing device operated by a mechanical power transmission, which is indicated in Patent Document 2, and damage of a peripheral device, which is caused when an electric fault is caused, can be set as slight damage.

Embodiment 7

Figure 12:
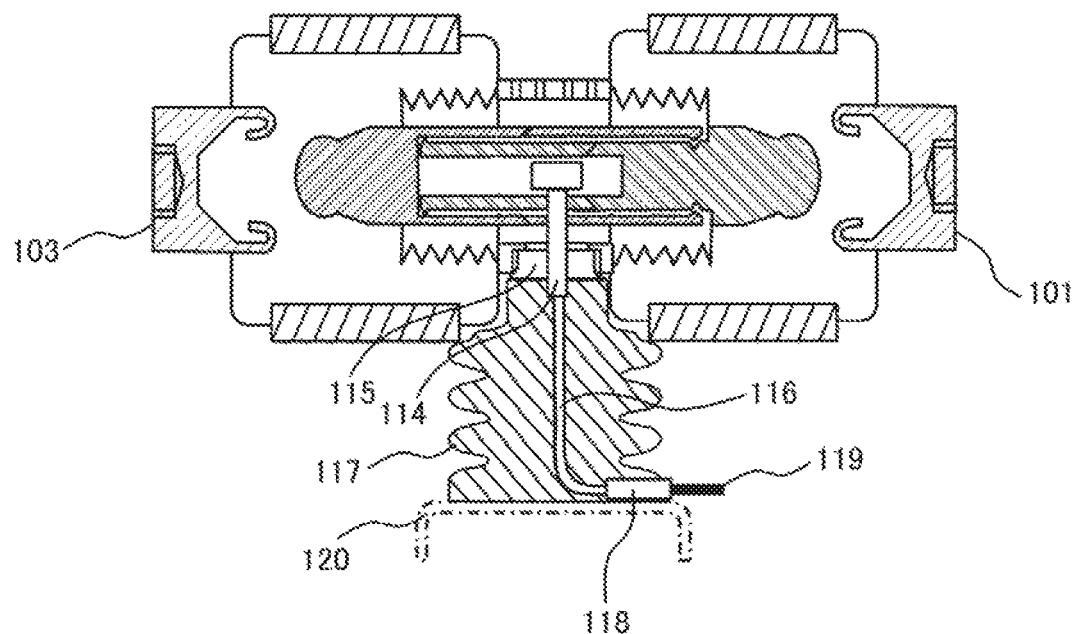
FIG. 12 is a schematic and cross-sectional view illustrating a high-speed closing device according to Embodiment 7 of the present invention.

FIG. 12 is a schematic and cross-sectional view illustrating a high-speed closing device according to Embodiment 7. A basic configuration of the high-speed closing device according to Embodiment 7 is identical to a basic configuration of the high-speed closing device which is described in Embodiment 6, so that only different parts will be explained.

The high-speed closing device according to Embodiment 7 is used by fixing to a structure 120, such as a case of switchgear, which is set at the earth electric potential, and an insulation supporting portion 117 has a function, by which an insulation operation, with respect to a middle electric potential which is caused between electric circuits of a first fixed contactor 101 and a second fixed contactor 103, between the insulation supporting portion 117 and the earth, is performed, and the insulation supporting portion 117 is fitted a fixing hardware 115 at the same time, and an initiation device 114, an optical fiber 116, and an optical connector 118 are covered, and the high-speed closing device is connected to the structure 120 (a state, in which an optical fiber 119 is connected to the optical connector 118, is illustrated). The insulation supporting portion 117 can use a mold component or the like, which uses, for example, an epoxy resin and is integrally molded and formed. The structure 120 and the insulation supporting portion 117 can be engaged and fixed to the structure 120 by using a bolt (not illustrated) which is penetrated to a bolt hall (not illustrated) which is formed at the insulation supporting portion 117.

In the high-speed closing device according to Embodiment 7, an electric circuit can be connected to the first fixed contactor 101 and the second fixed contactor 103 by using a lead wire or the like, and the high-speed closing device has a characteristic of the high-speed closing device which is indicated Embodiment 6, and has a characteristic by which the high-speed closing device can be attached at a free position. Therefore, when a high-speed closing device is newly manufactured, or when a high-speed closing device is additionally disposed at an existing facility, an effective arrangement plan can be realized, so that the arrangement plan is effective for a miniaturization and a space-saving of switchgear or an electric power receiving and transforming facility.

Embodiment 8

Figure 13:
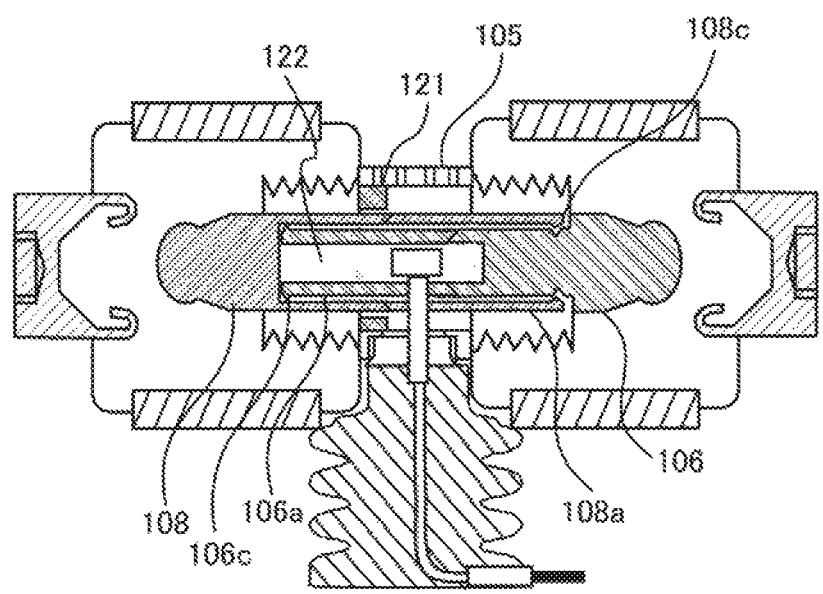
FIG. 13 is a schematic and cross-sectional view illustrating a high-speed closing device according to Embodiment 8 of the present invention.

FIG. 13 is a schematic and cross-sectional view illustrating a high-speed closing device according to Embodiment 8. A basic configuration of the high-speed closing device according to Embodiment 8 is identical to a basic configuration of the high-speed closing device which is described in Embodiment 6 and Embodiment 7, so that only different parts will be explained.

In the high-speed closing device according to Embodiment 8, a guide 121, by which a shifting operation of a first movable contactor 106 and a second movable contactor 108 is stabilized, is provided at an inner portion of an aerial case 105. The high-speed closing device is configured in such a way that slide operations of the first movable contactor 106 and the second movable contactor 108, in which the first movable contactor 106 and the second movable contactor 108 are respectively sifted in an opposite direction by a slide contact portion 106a, a slide contact portion 108a, a tip outer diameter portion 106c, and a tip inner diameter portion 108c, which are overlapping portions of a movable contactor connection component which is composed of the first movable contactor 106 and the second movable contactor 108, which have a nest configuration, are stabilized. Moreover, a gas generating portion 113 and an initiation device 114, which are disposed at a hollow portion 122 of the first movable contactor 106 and the second movable contactor 108, partly share a role of a guide for the slide operations.

In the high-speed closing device according to Embodiment 8, a guide 121 for a slide operation is included at a portion of the aerial case 105 in such a way that the guide 121 is positioned along an outer circumference portion of the movable contactor connection component, so that it is not required that the gas generating portion 113, the initiation device 114 or the like has a guide function, and a size of the gas generating portion 113, the initiation device 114 or the like is not limited, and a selection field of the gas generating portion 113, the initiation device 114 or the like is expanded, whereby a cost of the high-speed closing device can be reduced.

Embodiment 9

Figure 14:
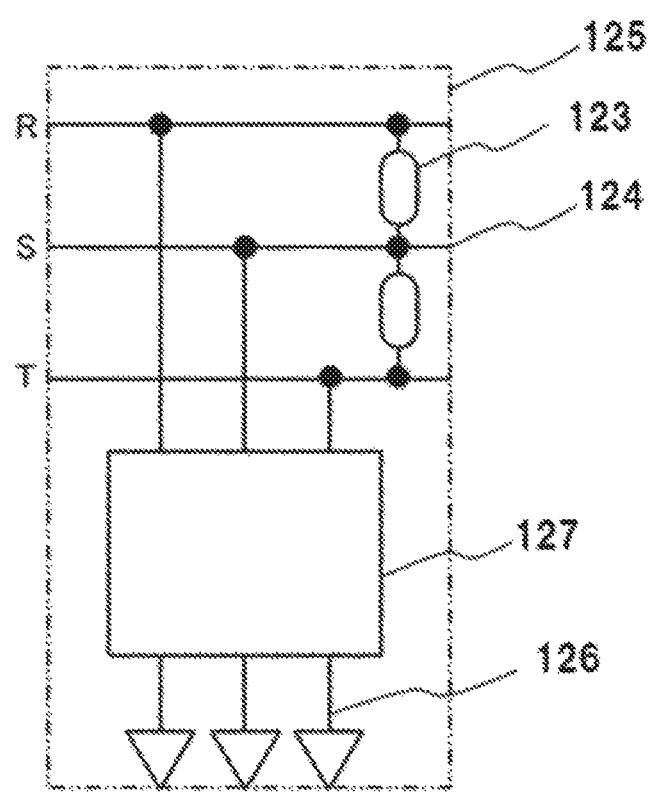
FIG. 14 is a configuration diagram illustrating switchgear which uses the high-speed closing device according to Embodiment 1 of the present invention.

In FIG. 14, a configuration of switchgear 125, in which the high-speed closing device 123, which is indicated in Embodiment 1, is used, is indicated. In this case, although the high-speed closing device 123, which is indicated in Embodiment 1, is used, the high-speed closing device, which is indicated in Embodiment 2 through Embodiment 8, can be also used. FIG. 14 indicates an example of the configuration of the switchgear 125, and a separation passage is provided between three-phase bus lines 124 in FIG. 14, and a high-speed closing device 123 is provided. In the other case, a separation passage is provided between the bus lines 124 and the earth, or between electric circuits 126 which are conned to the bus lines 124, or between the electric circuits 126 and the earth, and the high-speed closing device 123 can be disposed and used.

The electric circuits 126 are respectively connected to the three-phase bus lines 124, and each of the electric circuits 126 is connected to a device via a breaker 127. The high-speed closing device 123 is connected between each of the bus lines 124. When an electric fault is caused at any of the electric circuits 126, although the breaker 127 is instantly operated, a roughly 100 millisecond or more time is required in order to remove an arc, so that there is a case in which the device is destroyed until the arc is removed.

In the above-described case, the bus line 124, to which the electric circuit 126, in which an electric fault is caused within a very short time, is connected, is electrically connected to the adjacent bus line 124 by the high-speed closing device 123 in accordance with an operation of the breaker 127. An electric current, which is passed through the bus line 124 at which an electric fault is caused, is flowed to the other bus line 124 via the high-speed closing device 123 of which impedance is lower, so that an electric current is not supplied to a device, and it is prevented that the device is destroyed.

In the high-speed closing device according to Embodiment 9, the high-speed closing device 123, which is explained in Embodiment 1, is used, so that a supply of an electric current at a device can be stopped within a very short time, and a protection of the device can be realized.

DESCRIPTION OF THE SYMBOLS

"1" is a vacuum case; "1a," an insulating portion; "1b," a metal case portion; "1c," a plate; "1e," a partition frame; "1f," a flange; "1g," a slide guide portion; "2," a first fixed contactor; "2a," an engaging screen hole; "3," a second fixed contactor; "3a," an engaging screw hole; "4," a movable contactor; "4a," a closing contact portion; "4b," a slide portion; "4c," an insulating portion; "4d," a slide guide portion; "5," a diaphragm; "6," a mount; "6a," an engagement screw hole; "7," a gas generating portion; "8," an initiation device; "9," an optical fiber; "10," a connector; "11," an engagement component; "12," a diaphragm; "12a," a diaphragm 12a (before closing operation); "12b," a diaphragm 12b (after closing operation); "13," a movable contactor; "13a," a closing contact portion; "13b" a slide portion; "14," a movable contactor; "15," a slide guide portion; "16," a screw hole; "17," an attachment hole; "101," a first fixed contactor; "101a," a contact portion; "101b," an engagement means; "102," a first vacuum case; "102a," an insulating portion; "103," a second fixed contactor; "103a," a contact portion; "103b," an engagement means; "104," a second vacuum case; "104a," an insulating portion; "105," an aerial case; "105a," a screw portion; "105b," a vent hole; "106," a first movable contactor; "106a," a slide contact portion; "106b," a closing contact portion; "106c," a tip outer diameter portion; "106d," a notch portion; "107," a first bellows; "108," a second movable contactor; "108a," a slide contact portion; "108b," a closing contact portion; "108c," a tip inner diameter portion; "109," a second bellows; "110," a first vacuum portion; "111," a second vacuum portion; "112," an aerial portion; "113," a gas generating portion; "114," an initiation device; "115," a fixing hardware; "116," an optical fiber; "117" an insulation supporting portion; "118," an optical connector; "119," an optical fiber; "120," a structure; "121," a guide; "122," a hollow portion; "123," a high-speed closing device; "124," bus lines; "125," switchgear; "126," electric circuits; "127," a breaker.

What is claimed is:

1. A high-speed closing device comprising:
   a first fixed contactor which is made from a conductive material;
   a second fixed contactor which is made from a conductive material, and is arranged to face the first fixed contactor;
   a movable contactor, of which a tip is made from a conductive material, which includes a hollow hole, in which an opposite side of the tip is opened, at an inner portion, and is separated from the first fixed contactor and the second fixed contactor with a distance being longer than an insulation distance so as to be arranged before the high-speed closing device is closed, and the tip is inserted between the first fixed contactor and the second fixed contactor after the high-speed closing device is closed, and electrically connects the first fixed contactor and the second fixed contactor;
   a vacuum case having a vacuum portion and an aerial room, the vacuum portion is maintained in a decompression state; and
   a diaphragm, by which airtightness of the vacuum portion and the aerial room is maintained in a closing direction of the movable contactor,
   wherein the first fixed contactor and the second fixed contactor and the movable contactor are arranged in the vacuum case, and
   wherein the movable contactor is inserted between the first fixed contactor and the second fixed contactor by a buckling operation of the diaphragm, and electrically connects the first fixed contactor and the second fixed contactor.

2. A high-speed closing device as recited in claim 1, wherein a gas generating portion is arranged at the hollow hole.

3. A high-speed closing device as recited in claim 2, wherein the movable contactor is extruded and shifted by gas which is generated from the gas generating portion which is arranged at the hollow hole of the movable contactor, and the movable contactor is inserted between the first fixed contactor and the second fixed contactor, and electrically connects the first fixed contactor and the second fixed contactor.

4. A high-speed closing device as recited in claim 1, wherein the diaphragm includes thin-walled portions, which are concentrically formed, of which number is greater than or equal to one.

5. A high-speed closing device as recited in claim 1, wherein the diaphragm includes step shapes, which are concentrically formed, of which number is greater than or equal to one.

6. A high-speed closing device as recited in claim 1, wherein the movable contactor is approached to the first fixed contactor and the second fixed contactor, and an electromagnetic force, which is caused when an electric current is flowed in accordance with a generation of a pre-arc, is operated in a direction where the movable contactor is inserted between the first fixed contactor and the second fixed contactor.

7. A high-speed closing device as recited in claim 1, wherein the movable contactor is set at a middle electric potential in a state where the movable contactor is insulated from an earth electric potential.

8. A high-speed closing device as recited in claim 1, wherein an angle of the diaphragm with respect to a dead point of a buckling of the diaphragm before the movable contactor is closed is smaller than an angle of the diaphragm after the movable contactor is closed.

9. A high-speed closing device as recited in claim 2, wherein a slide guide portion, which guides a closing operation of the movable contactor, is made from an identical material of a flange portion which composes a part of the vacuum case.

10. A high-speed closing device as recited in claim 9, wherein the slide guide portion, which guides a closing operation of the movable contactor, is made from an insulation material.

11. A high-speed closing device as recited in claim 9, wherein a screw hole which is formed at an inner back portion of the hollow hole of the movable contactor, and an attachment hole of an initiation device of the gas generating portion, which is formed at the flange portion, are included, in a state where a diameter of the attachment hole is larger than a diameter of the screw hole.

12. A high-speed closing device comprising:
a movable contactor connection component which includes a first movable contactor and a second movable contactor, wherein the first movable contactor is made from a conductive material having a hollow cylindrical shape and has an opening portion at one end portion and a closing portion at the other end portion, and the second movable contactor is made from a conductive material having a hollow cylindrical shape and has an opening portion at one end portion and a closing portion at the other end portion, in a state where the opening portion of the second movable contactor is inserted to the opening portion of the first movable contactor in such a way that the opening portions have a nest configuration;
a first fixed contactor, which is made from a conductive material, and faces the closing portion of the first movable contactor with a constant distance when the device is not operated;
a second fixed contactor, which is made from a conductive material, and faces the closing portion of the second movable contactor with a constant distance when the device is not operated; and
a gas generating portion, which is arranged at a hollow portion which is formed at an inner portion of the movable contactor connection component.

13. A high-speed closing device as recited in claim 12, wherein
the closing portion of the first movable contactor and the first fixed contactor, and the closing portion of the second movable contactor and the second fixed contactor are electrically connected when the contactors are operated, and an electric current is passed between the first fixed contactor and the second fixed contactor.

14. A high-speed closing device as recited in claim 12, wherein an electric current passage, in which an electromagnetic force is acted, by passing an electric current between the first fixed contactor and the second fixed contactor, in a direction where the closing portion of the first movable contactor, which is electrically connected to the first fixed contactor, and the closing portion of the second movable contactor, which is electrically connected to the second fixed contactor, are maintained, is included.

15. A high-speed closing device as recited in claim 12, wherein gas is generated from the gas generating portion which is arranged at the hollow portion of the movable contactor connection component, and a pressure in the hollow portion is raised, and the first movable contactor and the second movable contactor, which compose the movable contactor connection component, are respectively shifted in a reverse direction.

16. A high-speed closing device as recited in claim 12, wherein the gas generating portion is a gas bomb which generates gas in accordance with control from the outside.

17. A high-speed closing device as recited in claim 12, wherein the gas generating portion is a gunpowder which generates gas in accordance with control from the outside.

18. A high-speed closing device as recited in claim 12, wherein the movable contactor connection component is arranged in a vacuum case, and the first fixed contactor and the second fixed contactor are respectively arranged at surfaces, which face each other, in each of surfaces which compose the vacuum case.

19. A high-speed closing device as recited in claim 18, wherein the vacuum case includes a first vacuum case, which includes the first fixed contactor and the first movable contactor, and a second vacuum case, which includes the second fixed contactor and the second movable contactor, in a state where the first vacuum case and the second vacuum case are connected by an aerial case which is not set in a decompression state.

20. A high-speed closing device as recited in claim 19, wherein shape specifications of the two fixed contactors, the two vacuum cases, and the two movable contactors are identical each other.

21. A high-speed closing device as recited in claim 19, wherein the aerial case is fixed to a structure, which is set at an earth electric potential, by an insulation support component.

22. A high-speed closing device as recited in claim 21, wherein a slide guide, which guides an outer circumference portion of the movable contactor connection component, is provided at an inner surface of the aerial case.

23. A switchgear comprising:
a bus line;
an electric circuit which is connected to the bus line;
a breaker which is provided at the electric circuit; and
the high-speed closing device, as recited in claim 1, which is provided at a branch passage from the bus line or the electric circuit.

24. A switchgear comprising:
a bus line;
an electric circuit which is connected to the bus line;
a breaker which is provided at the electric circuit; and
the high-speed closing device, as recited in claim 12, which is provided at a branch passage from the bus line or the electric circuit.

* * * * *